United States Patent
Presley

(10) Patent No.: US 7,418,484 B2
(45) Date of Patent: Aug. 26, 2008

(54) SYSTEM AND METHOD FOR ACTIVELY MANAGING AN ENTERPRISE OF CONFIGURABLE COMPONENTS

(75) Inventor: Darryl Lee Presley, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1264 days.

(21) Appl. No.: 09/998,095

(22) Filed: Nov. 30, 2001

(65) Prior Publication Data

US 2003/0105838 A1    Jun. 5, 2003

(51) Int. Cl.
*G06F 15/177* (2006.01)

(52) U.S. Cl. .................... 709/220; 709/223

(58) Field of Classification Search ........... 707/104.1, 707/200; 709/220, 221, 223, 224, 208; 713/100, 713/171
See application file for complete search history.

(56) References Cited

U.S. PATENT DOCUMENTS

| | | | |
|---|---|---|---|
| 5,495,610 A | | 2/1996 | Shing et al. |
| 5,832,503 A | | 11/1998 | Malik et al. |
| 5,838,918 A | | 11/1998 | Prager et al. |
| 5,968,179 A | * | 10/1999 | Barkey et al. .......... 726/11 |
| 6,047,323 A | * | 4/2000 | Krause .................. 709/227 |
| 6,098,098 A | * | 8/2000 | Sandahl et al. ......... 709/221 |
| 6,108,782 A | * | 8/2000 | Fletcher et al. ......... 713/153 |
| 6,167,445 A | * | 12/2000 | Gai et al. ................ 709/223 |
| 6,205,482 B1 | * | 3/2001 | Navarre et al. .......... 709/227 |
| 6,247,128 B1 | * | 6/2001 | Fisher et al. ............ 713/100 |
| 6,301,613 B1 | | 10/2001 | Ahlstrom et al. |
| 6,321,267 B1 | * | 11/2001 | Donaldson ............. 709/229 |
| 6,341,287 B1 | * | 1/2002 | Sziklai et al. ........... 707/102 |
| 6,405,251 B1 | * | 6/2002 | Bullard et al. .......... 709/224 |
| 6,490,574 B1 | * | 12/2002 | Bennett et al. ........... 706/47 |

(Continued)

FOREIGN PATENT DOCUMENTS

FR    2 801 705 A1    6/2001

(Continued)

OTHER PUBLICATIONS

Internatinal Searching Authority, "Notification of Transmittal of the International Search Report or the Declaration," Mar. 2, 2004, 7 pages.

(Continued)

*Primary Examiner*—Thong H Vu
(74) *Attorney, Agent, or Firm*—Hickman, Palermo, Truong & Becker LLP; Howard H. Louie

(57) ABSTRACT

A system and method for actively managing an enterprise of configurable components is described. A configuration for at least one individual component in a managed domain is stored. The configuration includes a set of configuration parameters and type definitions. A mapping of the configurations is defined between at least two of the individual components. Each mapping specifies a configuration parameter with a relationship dependent on at least one other such configuration parameter. Each such individual component is registered. The configuration parameters and type definitions are validated based on a master set of configuration parameters and type definitions defined for an enterprise. The mappings within the enterprise are enforced by dynamically probing the validated configurable parameters for each such individual component.

20 Claims, 12 Drawing Sheets

U.S. PATENT DOCUMENTS

| | | | |
|---|---|---|---|
| 6,502,131 B1* | 12/2002 | Vaid et al. | 709/224 |
| 6,581,093 B1* | 6/2003 | Verma | 709/220 |
| 6,598,057 B1* | 7/2003 | Synnestvedt et al. | 707/200 |
| 6,643,652 B2* | 11/2003 | Helgeson et al. | 707/10 |
| 6,658,625 B1* | 12/2003 | Allen | 715/236 |
| 6,675,370 B1* | 1/2004 | Sundaresan | 717/106 |
| 6,691,138 B1* | 2/2004 | Kirkpatrick et al. | 707/204 |
| 6,728,723 B1 | 4/2004 | Kathail et al. | |
| 6,735,630 B1* | 5/2004 | Gelvin et al. | 709/224 |
| 6,754,699 B2* | 6/2004 | Swildens et al. | 709/217 |
| 6,760,761 B1* | 7/2004 | Sciacca | 709/220 |
| 6,775,697 B1* | 8/2004 | Surazski et al. | 709/220 |
| 6,785,713 B1* | 8/2004 | Freeman et al. | 709/208 |
| 6,816,903 B1* | 11/2004 | Rakoshitz et al. | 709/226 |
| 6,834,298 B1* | 12/2004 | Singer et al. | 709/220 |
| 6,847,993 B1* | 1/2005 | Novaes et al. | 709/221 |
| 6,892,231 B2* | 5/2005 | Jager | 709/220 |
| 6,892,235 B1* | 5/2005 | Daude et al. | 709/224 |
| 6,898,618 B1* | 5/2005 | Slaughter et al. | 709/203 |
| 6,917,929 B2* | 7/2005 | Teloh et al. | 707/1 |
| 6,968,389 B1* | 11/2005 | Menditto et al. | 709/233 |
| 6,981,029 B1* | 12/2005 | Menditto et al. | 709/217 |
| 6,983,321 B2* | 1/2006 | Trinon et al. | 709/224 |
| 6,995,675 B2* | 2/2006 | Curkendall et al. | 340/573.3 |
| 7,076,547 B1* | 7/2006 | Black | 709/224 |
| 7,089,263 B2 | 8/2006 | Arnold et al. | |
| 7,257,635 B2 | 8/2007 | Chellis et al. | |
| 7,263,699 B2* | 8/2007 | Jacquemot et al. | 717/174 |
| 7,305,393 B2 | 12/2007 | Seeger et al. | |
| 2002/0083343 A1* | 6/2002 | Crosble et al. | 713/201 |
| 2002/0099806 A1* | 7/2002 | Balsamo et al. | 709/223 |
| 2002/0145981 A1* | 10/2002 | Klinker et al. | 370/244 |
| 2002/0178380 A1* | 11/2002 | Wolf et al. | 713/201 |
| 2003/0023707 A1* | 1/2003 | Ryan | 709/220 |
| 2003/0033400 A1* | 2/2003 | Pawar et al. | 709/223 |
| 2003/0065762 A1* | 4/2003 | Stolorz et al. | 709/223 |
| 2003/0097564 A1* | 5/2003 | Tewari et al. | 713/171 |
| 2003/0115456 A1* | 6/2003 | Kapoor | 713/156 |
| 2003/0154279 A1* | 8/2003 | Aziz | 709/225 |
| 2003/0177025 A1* | 9/2003 | Curkendall et al. | 705/1 |
| 2006/0040648 A1 | 2/2006 | Vikman et al. | |
| 2006/0085155 A1* | 4/2006 | Miguelanez et al. | 702/118 |
| 2006/0123016 A1 | 6/2006 | Ashok et al. | |
| 2006/0143608 A1 | 6/2006 | Dostert et al. | |
| 2006/0195816 A1* | 8/2006 | Grandcolas et al. | 717/101 |
| 2006/0282471 A1 | 12/2006 | Mark et al. | |

FOREIGN PATENT DOCUMENTS

| | | | |
|---|---|---|---|
| WO | WO 01/75677 A1 | 10/2001 | |

OTHER PUBLICATIONS

FR 2801 705 A1 English translation fo p. 6, lines 1-23 and p. 7, line 19 to p. 8, line 14.

International Searching Authority, "Notification of Transmittal of the International Search Report or the Declaration," Mar. 2, 2004, 7 pages.

State Intellectual Property Office of the P.R.C., " Notification of the First Office Action," App. No. 02823795.1, dated Nov. 10, 2006, received on Dec. 26, 2006, pages.

Claims for App. No. 02823795.1, 11 pages.

European Patent Office, "Communication pursuant to Article 96(2) EPC," App. No. 02804452.7, dated May 31, 2006, 3 pages.

Current Claims, App. No. 02804452.7, 6 pages (attached).

* cited by examiner

Figure 7 (con'd).
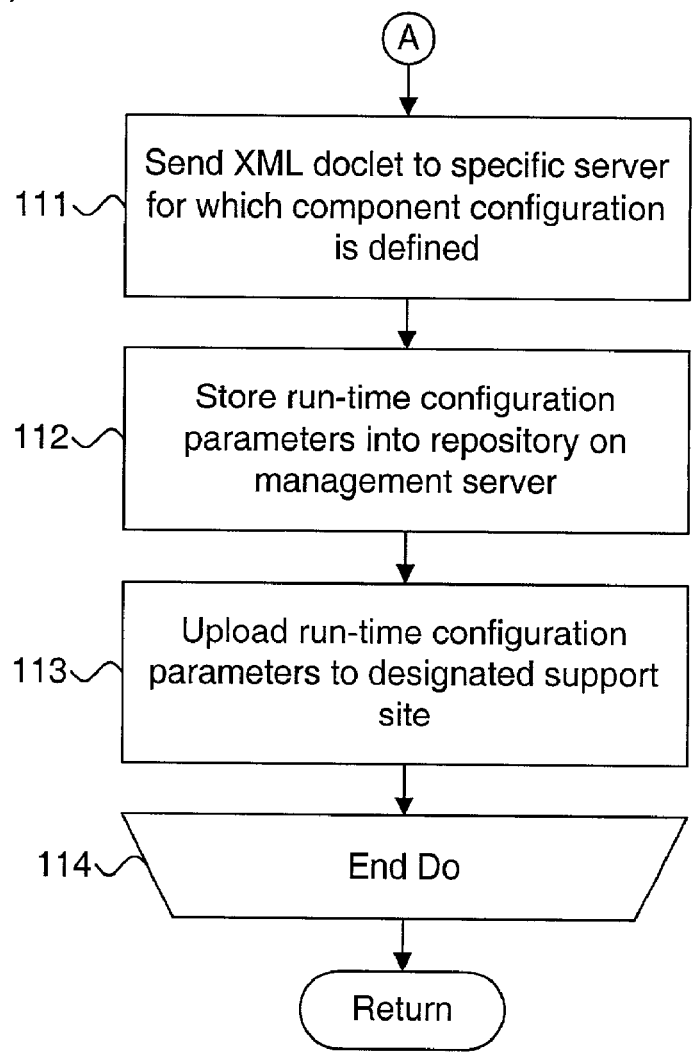

Figure 10 (con'd).
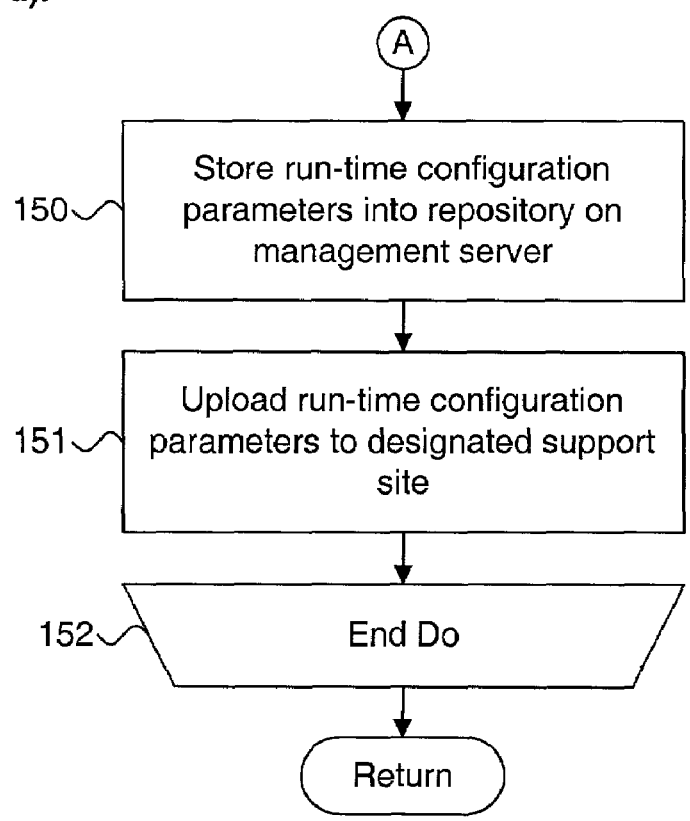

SYSTEM AND METHOD FOR ACTIVELY MANAGING AN ENTERPRISE OF CONFIGURABLE COMPONENTS

COPYRIGHT NOTICE

A portion of the disclosure of this patent document contains material subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present invention relates in general to enterprise component management and, in particular, to a system and method for actively managing an enterprise of configurable components.

BACKGROUND OF THE INVENTION

Enterprise computing environments include individual localized intranetworks interconnected via wide area internetworks or "Internets." The internetworks can include geographically distributed resources which, when taken as a whole, comprise a unified set of loosely-associated computers. The Internet is an example of a widely used public internetwork that can form part of an enterprise computing environment.

Most enterprise computing environments consist of heterogeneous computing systems, ranging from network appliances and personal computers to mainframes and specialized servers providing access to World Wide Web ("Web") content, Internet applications, and databases. To promote interoperability among these network components, configuration parameters must be carefully designated and tuned to maximize system performance and minimize areas of potential conflict and concern.

The ability to effectively manage inter-platform configurations is crucial to providing reliable and predictable performance. However, providing configuration management on an inter-platform basis is difficult. Different configurations of hardware, operating system, mid-tier and application software present a combinatoric maze of potential configuration parameter scenarios. Commonly-occurring combinations of inter-platform parameter configurations are often discovered by chance only after time-consuming trial and error.

As an example, a Unix operating system-based database server employing a shared memory model must be configured with a fixed number of buffers, shared memory pool space and processes to allow concurrent operation with multiple database instances. The operating system must also be configured to support an upper bound on shared memory size with a sufficient number of semaphores. The dependent relationships between the operating system configuration parameters and those mandated by the database shared memory model are critical to providing reliable concurrent database operation.

Many software vendors, such as Oracle Corporation, Redwood Shores, Calif., provide certified configurations that guarantee an acceptable level of performance and interoperability. Nevertheless, changes falling outside the bounds of certified configurations can propagate through an enterprise and cause a negative, and often unintentional, effect on dependent systems. Identifying dependent configuration parameter relationships is crucial to enabling impact analyses to be performed prior to effecting actual changes. Validating configuration parameters forms the core of impact analysis.

One problem in managing enterprise environments is the difficulty in checking dependent relationships a priori. The single system paradigm is widely accepted as a sufficient solution. For example, Windows-based environments employ a registry which records the installation of applications and components. The registry aids only individual system configuration management and does not allow the impact of a configuration parameter change be checked against the enterprise. Although dependent relationships may be implicit in the configuration parameter values used, the dependent relationships themselves are not reflected on an inter-platform basis and cannot, therefore, be validated properly.

A further problem in managing enterprise environments is maintaining a consistent definition of "the truth," that is, the global master schemas for component, parameter, and node resource definitions. A related problem is enforcing the master configuration definitions against individual components operating within the enterprise.

In the prior art, four solutions attempt to provide inter-platform configuration management. These include the Infrastructure Management program, licensed by BMC, Houston, Tex.; Tivoli Business System Manager, licensed by IBM, Armonk, N.Y.; Platinum, licensed by Computer Associates, Islandia, N.Y.; and AutoDBA, licensed by SenWare, Golden, Colo. The Infrastructure Management program is composed of multiple modules which monitor and manage different parts of the infrastructure independent of each other. The Tivoli Business System Manager provides a single point of control for managing groups of applications across nodes and distributed systems. Platinum provides performance and event monitoring with user-defined job automation. AutoDBA utilizes neural networks for learned behavior. Although providing some form of inter-platform configuration management, the forgoing solutions fail to provide dependent relationship and context-based configuration management.

Therefore, there is a need for an approach to providing declarative enterprise-wide configuration validation and management. Preferably, such an approach would provide a configuration management operating from a common entry point on an internetwork and intranetwork basis.

There is a further need for an approach to providing a framework for enabling intra- and inter-platform software integration. Preferably, such an approach would identify and enforce configuration management policies through identified dependent relationships and parameter definitions.

SUMMARY OF THE INVENTION

The present invention provides a system and method for dynamically managing configuration parameters applied in individual network components in an enterprise computing environment. A centralized management system includes a management configuration module that functions as the arbiter of all configuration parameter changes throughout a managed domain. A set of global parameter definitions and document type definitions are maintained in a database repository accessed by the management configuration module. Individual network components execute within the enterprise computing environment and are configured with configuration parameters as validated and managed by the management configuration module. Upon the installation or changing of a managed component, the configuration parameters are uploaded to the management configuration module as well-formed XML doclets. Each component is registered and each change is then validated, analyzed and managed. Validated changes are then propagated back to the individual network components as well-formed XML doclets and are chronicled in the database repository for future historical use and impact analysis.

One embodiment is a system and method for actively managing an enterprise of configurable components. A configuration for at least one individual component in a managed domain is stored. The configuration includes a set of configuration parameters and type definitions. A mapping of the configurations is defined between at least two of the individual components. Each mapping specifies a configuration parameter with a relationship dependent on at least one other such configuration parameter. Each such individual component is registered. The configuration parameters and type definitions are validated based on a master set of configuration parameters and type definitions defined for an enterprise. The mappings within the enterprise are enforced by dynamically probing the validated configurable parameters for each such individual component.

A further embodiment is a system and method for providing a framework for centrally managing configurations of distributed computing components. A plurality of individual components are interfaced. Each component includes a client module applying document type definitions and storing configuration parameters. A database repository storing master document type definitions and global parameter definitions is maintained. The database repository is accessed and actively manages the individual components. The stored document type definitions for each individual component are retrieved via the corresponding client module. The configuration parameters are extracted from each retrieved document type definition with the master document type definitions. Each extracted configuration parameter is validated against the validated configuration parameters in the global parameter definitions.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

APPENDICES A-D include, by way of example, a sample document type definition (Appendix A), an XML doclet (Appendix B) and doclet fragments (Appendices C-D) formatted in accordance with the present invention.

DETAILED DESCRIPTION

Figure 1:
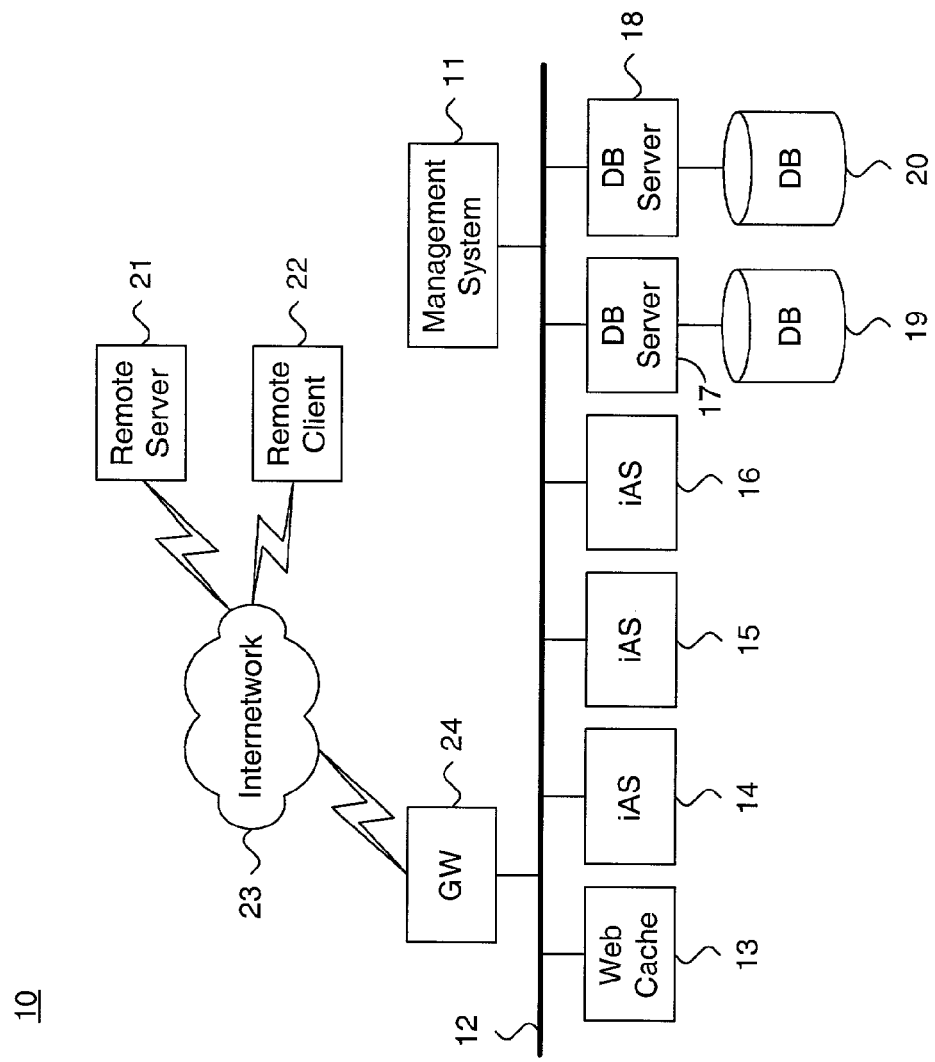
FIG. 1 is a block diagram showing an enterprise computing environment, including a system for actively managing an enterprise of configurable components, in accordance with the present invention.

FIG. 1 is a block diagram showing an enterprise computing environment 10, including a system for actively managing an enterprise of configurable components 11, in accordance with the present invention. The enterprise computing environment 10 comprises an intranetwork 12 interconnected to an internetwork 23, including the Internet, via a gateway 24 or similar bridging device. Other network topologies and configurations, and arrangements of clients, servers and components are feasible, as would be recognized by one skilled in the art.

The management system 11 configures, validates and manages the configuration parameters of a plurality of systems interconnected over the internetwork 12, including a Web cache 13, Internet application servers (iAS) 1416, and database (DB) servers 17-18. The Web cache 13 provides dynamic caching of Web content for third party Web servers (not shown). The Internet application servers 14-16 flexibly execute Web site, portal and Internet applications to provide access to both traditional Web browsers and mobile devices. The database servers 17-18 are respectively coupled to relational databases 19-20 to provide management and access to structured data records. In addition, the management system 11 can manage and configure remote systems, including a remote server 21 and remote client 22 interconnected via the internetwork 23.

The management system 11 automates and validates configuration changes to the runtime enterprise environment for the set of systems, including the Web cache 13, Internet application servers 14-16, and database servers 17-18 within a managed domain. The management system 11 provides a framework to enable the integration and management of system and user software from a common entry point, as further described below beginning with reference to FIG. 2. The individual dependent relationships between the various enterprise components are managed by the management system 11 which utilizes a context-based impact analysis prior to validating proposed changes to the configuration parameters. Each managed component maintains a stored document type definition containing configuration parameters and values expressed as declarative definitions. In the described embodiment, the document type definitions are defined as doclets written in an Extensible Markup Language (XML) format.

The individual computer systems, including management system 11 and network managed components 13-18, 21, 22 are general purpose, programmed digital computing devices consisting of a central processing unit (CPU), random access memory (RAM), non-volatile secondary storage, such as a hard drive or CD ROM drive, network interfaces, and peripheral devices, including user interfacing means, such as a keyboard and display. Program code, including software programs and data, are loaded into the RAM for execution and processing by the CPU and results are generated for display, output, transmittal, or storage.

Figure 2:
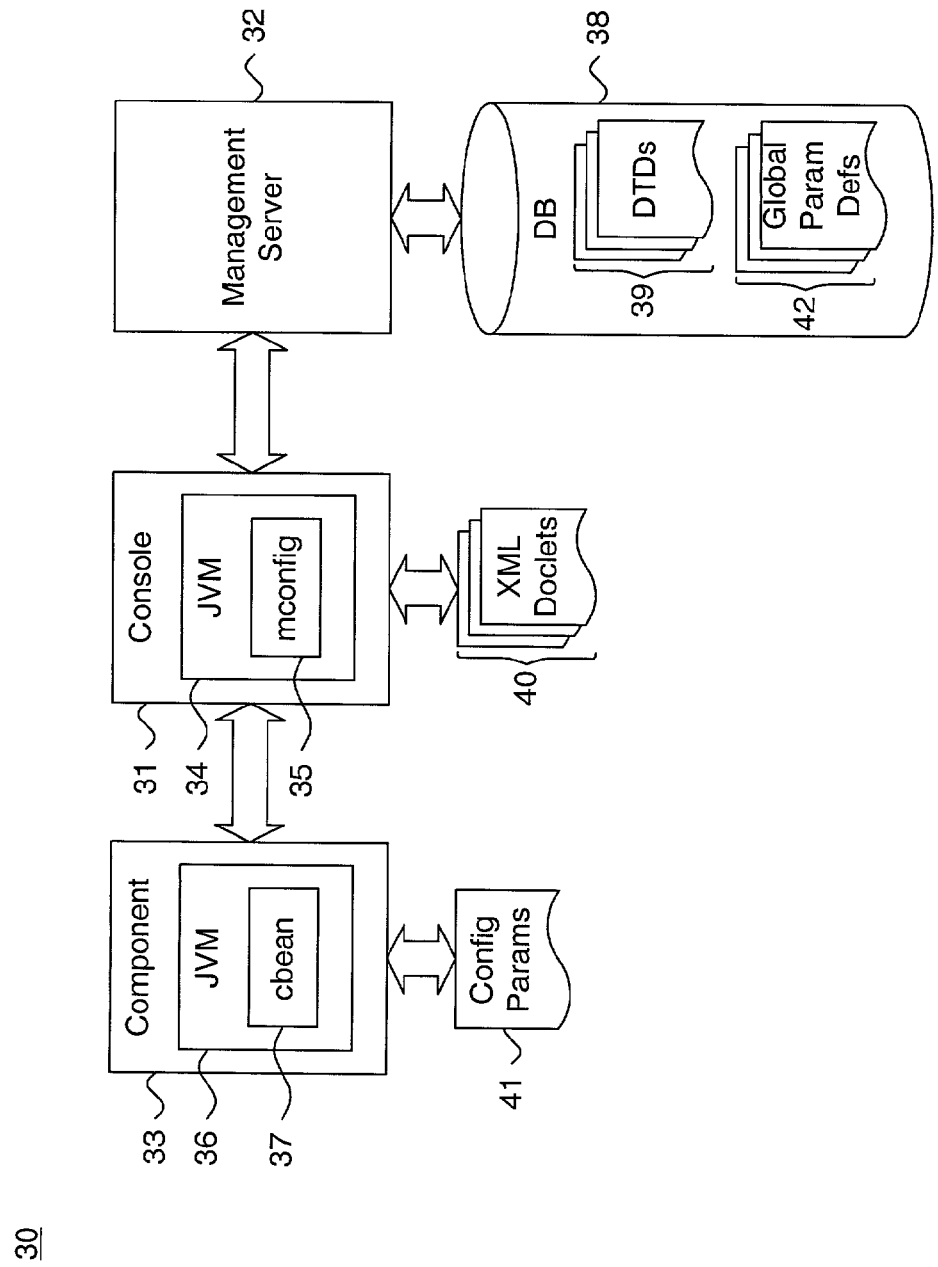
FIG. 2 is a block diagram showing the system for actively managing an enterprise of configurable components of FIG. 1.

FIG. 2 is a block diagram showing the system for actively managing an enterprise of configurable components of FIG. 1. The management system defines a framework 30 that includes each of the individual network components 33, a management console 31 and a management server 32. Each individual network component 33 executes a client module (cbean) 37 on a Java virtual machine (JVM) 36. The client modules 37 access stored configuration parameters 41. Each set of configuration parameters 41 stores the values of the tunable configuration parameters for operating system, midtier and application software executing on that particular network component 33.

In the described embodiment, the management console 31 executes as a Web browser-based application that presents an intuitive and user-friendly user interface. The core of the management system 30 is a management configuration (mconfig) module 35 that executes as a Java server application (servlet) on a Java virtual machine (JVM) 34. Alternatively, the management configuration module 35 could be a stand-alone application or implemented as a form of active server page, as would be recognized by one skilled in the art.

The management console 31 interfaces to a management server 32, coupled to a database repository 38. The database repository 38 includes a set of document type definitions (DTDs) 39 and a set of global parameters 42. Each document type definition 39 provides a master declarative definition of component parameters and dependent relationships for intra- and inter-platform software. Each DTD 39 identifies individual configuration parameters and defines a value type, value range and parameter reference relationships. In addition, the form of each dependent relationship is also defined and can include one-way, two-way, cyclic, one-to-many-to-one, and many-to-many relationships. Each global parameter definition 42 provides a consistent master definition of configuration parameter values to be used by each of the network components 33.

Operationally, the management configuration module 35 periodically probes the individual network components 33 for new or changed network components. The management configuration module 35 probes the individual network components 33 to discover new hardware resources, such as the number of processors, amount of physical random access memory, number of network interface cards, disk capacity, and so forth, to factor into the validation, impact analysis, and change control performed. In the described embodiment, the management configuration module 35 implements the public application programming interface (API) used by the Java Management Extension (JMX) to invoke various services needed to collect, validate and analyze the individual configuration parameters 41.

Upon discovering a new or changed component or server, the management configuration module 35 requests and receives the runtime configuration parameters 41 from the corresponding client module 37. The configuration parameters 41 are received as well-formed XML doclets 40. Each XML doclet 40 conforms to the XML schema used by the management configuration module 35. The XML doclets 40 allow the management configuration module 35 to construct a component parameter relationship dependency tree for use in impact analysis. Only those modules where a change has been discovered will be validated in an established enterprise, to minimize network traffic.

The management configuration module 35 registers and validates each network component 33. The configuration parameters 41 are validated against the master document type definitions 39 maintained in the database repository 38. The master document type definitions 39 allow the supporting of certified configurations by enforcing the configuration parameters as a configuration policy. Upon the completion of validation, the management configuration module 35 generates and distributes a runtime XML doclet 40 that describes the resources used by each server in the enterprise computing environment 10 (shown in FIG. 1).

Figure 3:
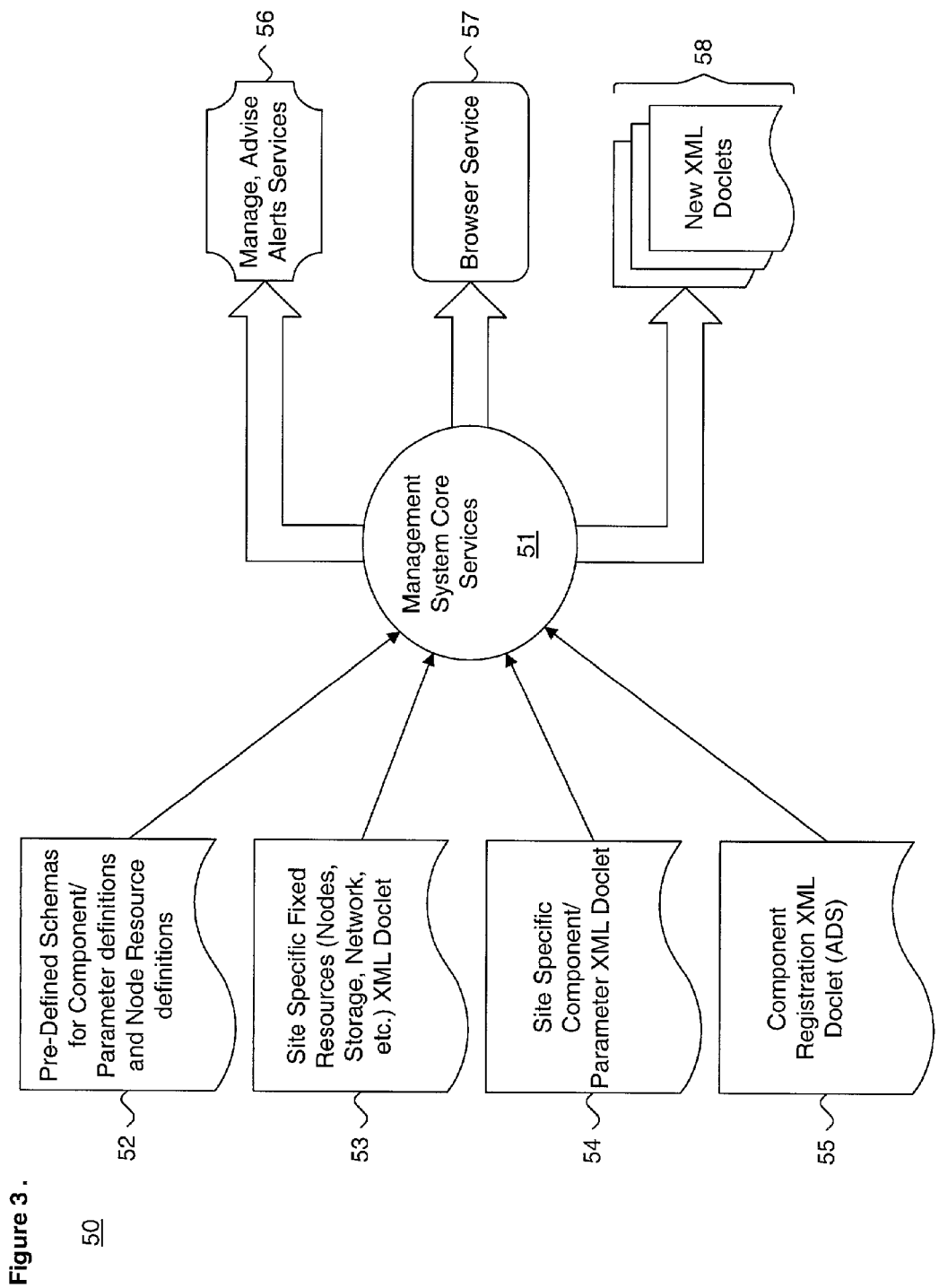
FIG. 3 is a data flow diagram of the core services provided by the management system of FIG. 2.

FIG. 3 is a process flow diagram 50 of the core services 51 provided by the management system 11 of FIG. 1. The management system core services 51 include the following:
(1) Parameter validation check;
(2) Impact analysis prior to effecting a configuration parameter change;
(3) Consistent parameter change management based on impact analysis;
(4) Configuration version control;
(5) Restart and reboot from last valid configuration;
(6) Field configuration download service for new versions of document type definitions 39 (shown in FIG. 2) and parameter definitions; and
(7) Field configuration upload to a centralized support site.

The core services 51 depend on four primary sources of input. First, predefined schemas for component and parameter definitions and node resource definitions 51 are retrieved by the management server 32 from the database repository 38 (shown in FIG. 2). In addition, XML doclets containing site-specific fixed resources 53, site-specific components and parameters 54 and component registrations 55 are received from the individual network components 33 (shown in FIG. 2).

The core services 51 obtain the site-specific resource and component configuration XML doclets 53-55 by invoking probing service layers (not shown). The core services 51 analyze, advise, and correct out-of-bound and invalid configuration parameters and identify cyclic relationships. A set of new XML doclets 58 are generated and fielded to the individual network components 33 for implementation. The core services 51 also exports management, advising and alert services 56. The core services 51 can be exported through a browser service 57, as implemented on the management console 31 (shown in FIG. 2).

The attached Appendices include, by way of example, a sample document type definition (Appendix A), an XML doclet (Appendix B) and doclet fragments (Appendices C-D) formatted in accordance with the present invention for a hypothetical system having two processors, two gigabytes of random access memory, one network interface card, and 64 gigabytes of local disk space divided into four separate 17.2 gigabyte disk devices.

Appendix A shows a sample document type definition for a managed node and resources in terms of specific hardware and software resources. The document type definition is used to generate a well-formed XML doclet.

Appendix B shows the XML doclet generated from the document type definition of Appendix A. The doclet includes a DOCLET_VERSION and a DOCLET_DATE tag to allow multiple versions of the doclet to be maintained. The XML tags and attributes allow load resources to be defined for an unlimited number of nodes within a managed domain. For efficiency, each doclet can be stored in a database repository in XML format.

When resources are configured on a given server node, the GLOBAL_NODE_DOCLET tag is referenced to determine if the resource exists and the available capacity, thereby preventing the overcommitment of resources. If the resource does not exist, the component configuration parameter is marked as invalid, thereby preventing the nonexistent resource from being configured.

Appendix C shows a sample doclet fragment that includes a declarative COMPUTED_VALUE tag. This type of doclet tag allows dependent parameter relationships to be dynamically managed by expressly defining dependent configuration parameter relationships as a computable value. The COMPUTED_VALUE tag includes an equation "1.1*:R_001," which specifies the parameter definition for SESSIONS based on the number of PROCESSES.

Appendix D shows a sample doclet fragment illustrating intra-platform dependent relationships. By way of example, if the PROCESSES parameter is set to equal 300, the SESSIONS parameter is set to 330. As well, the REF_PARAMETER tag provides the component type, name and node reference for formulating the value of the SESSIONS tag.

Other forms of doclets, including various doclet implementations and other uses of scripting or non-scripting languages, and various tag definitions and arrangements, are feasible, as would be recognized by one skilled in the art.

Figure 4:
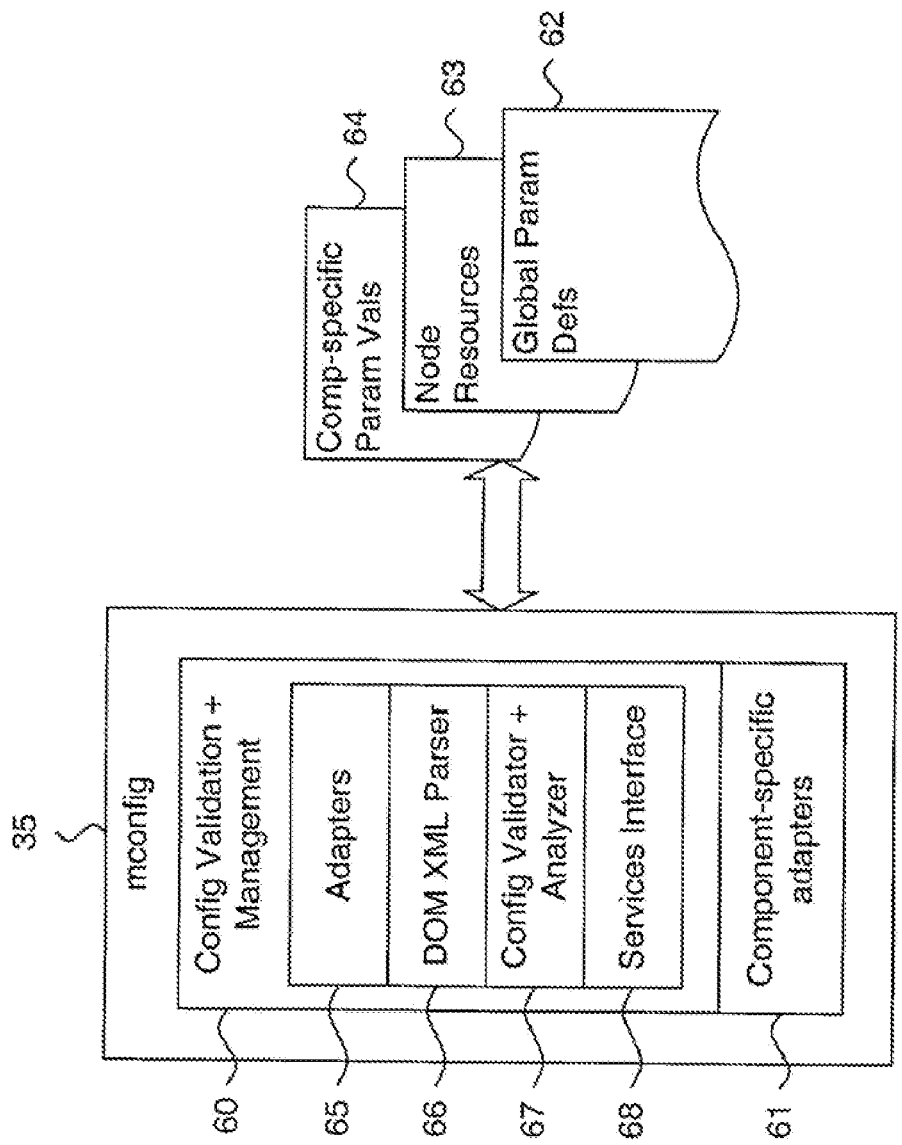
FIG. 4 is a block diagram showing the software modules of the management configuration module of FIG. 2.

FIG. 4 is a block diagram showing the software modules of the management configuration module 35 of FIG. 2. The management configuration module 35 includes two main components: configuration, validation and management 60 and component-specific adapters 61. The configuration validation management 60 is composed of the following parts:

(1) Adapters 65: Used for reading and writing component-specific parameters received through the client modules 37 (shown in FIG. 2) and via an Internet application server (iAS) system management interface (SMI) classes to read and write specific parameter files.
(2) DOM XML parser 66: Reads and extracts XML doclet fragments from XML doclets 40.
(3) Configuration validater and analyzer 67: Ensures runtime configuration parameters are within operating values as specified by retrieved document type definitions 39 (shown in FIG. 2).
(4) Service interfaces 68: Registers, validates and retrieves configuration parameters 41 from individual network components 33 (shown in FIG. 2).

The configuration validation management component 60 can include multiple adapters 65 and service interfaces 68 to accommodate various forms of network components.

The component-specific adapters 61 read and write component-specific parameter file formats for heterogeneous network components 33.

The configuration validation management component 60 accesses stored global parameter definitions 62, node resources 63, and component-specific parameter values 64, all stored as well-formed XML doclets. The global parameter definitions 62 and node resources 63 are maintained in the database repository 38 accessible by the management server 32. Each proposed specific parameter value set 64 is retrieved from the individual network component 33 and stored in the database repository 38 for history and impact analysis.

In the described embodiment, the management configuration module 35 can be invoked either via interactive access or automated processing. Interactive access includes Web browser-based access and stand-alone programs that allow system administrators and other authorized users to view, change history, and, if authenticated, allow changes to the managed systems. When invoked via automation, the only service provided is component validation dependency checks to ensure that the pre-arranged configuration parameters are valid and that the dependent relationships hold true. The management configuration module 35 can be invoked via automation whenever a new network component or server is installed or deployed, or when run on a periodic basis.

Each module is a computer program, procedure or module written as source code in a conventional programming language, such as the C++ programming language, and is presented for execution by the CPU as object or byte code, as is known in the art. The various implementations of the source code and object and byte codes can be held on a computer-readable storage medium or embodied on a transmission medium in a carrier wave. The management system 11 operates in accordance with a sequence of process steps, as further described below with reference to FIG. 5.

Figure 5:
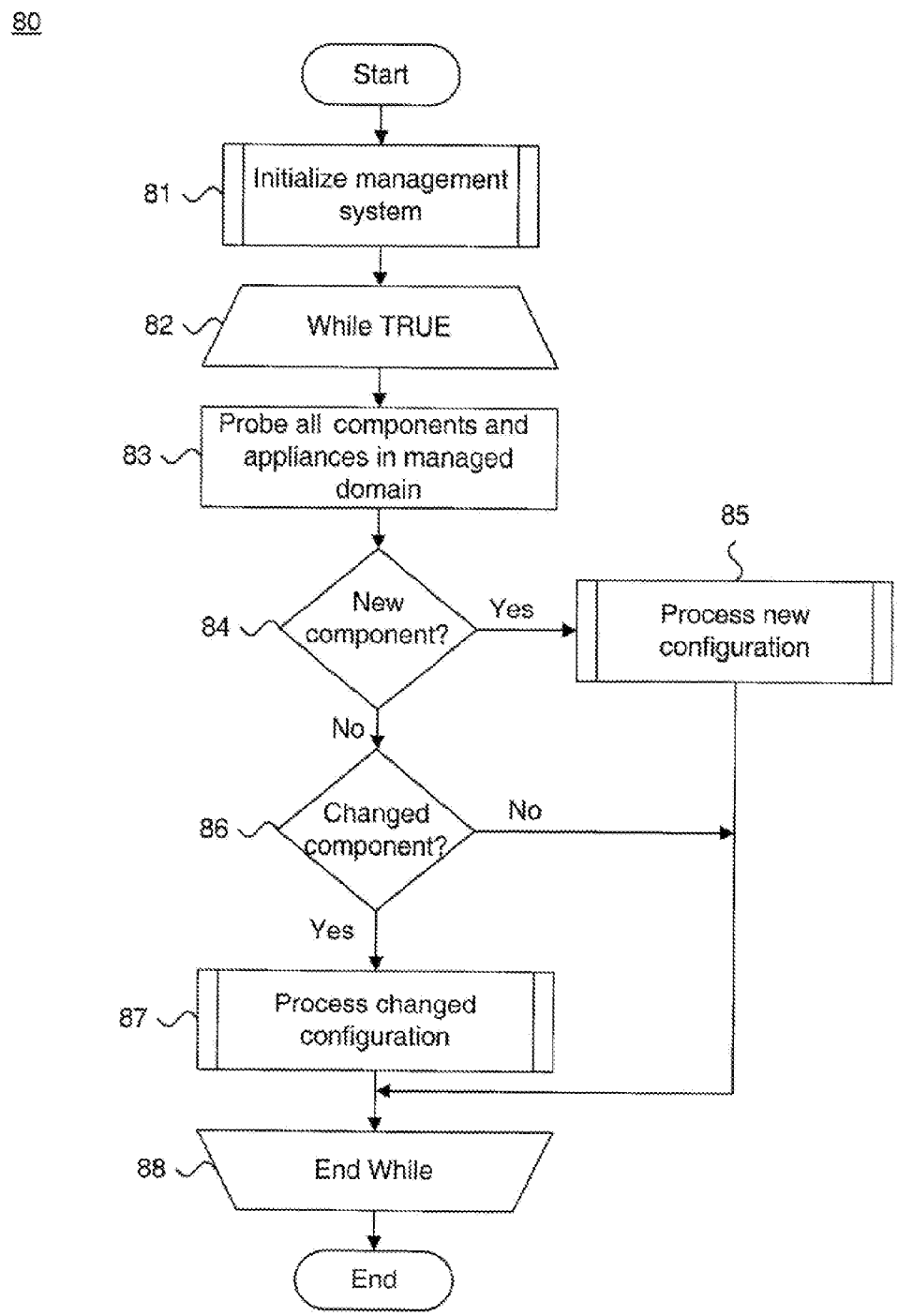
FIG. 5 is a flow diagram showing a method for actively managing an enterprise of configurable components.

FIG. 5 is a flow diagram showing a method for actively managing an enterprise of configurable components 80, in accordance with the present invention. The method first initializes the management system 30 (shown in FIG. 2) (block 81), as further described below with reference to FIG. 6. The management system 11 then enters an iterative and continuous processing loop (blocks 82-88), which ends when the management system 11 is terminated or shut down.

During each iteration (block 82), all network components and servers in the managed domain are probed (block 83) by requesting each client module 37 to identify, register and validate any new or changed components or servers. If a new component or server is discovered through probing (block 84), the new configuration is processed (block 85), as further described below with reference to FIG. 7. Otherwise, if a changed configuration is discovered (block 86), the changed configuration is processed (block 87), as further described below with reference to FIG. 10. Iterative processing proceeds (block 78) continuously until the system is terminated or shut down.

Figure 6:
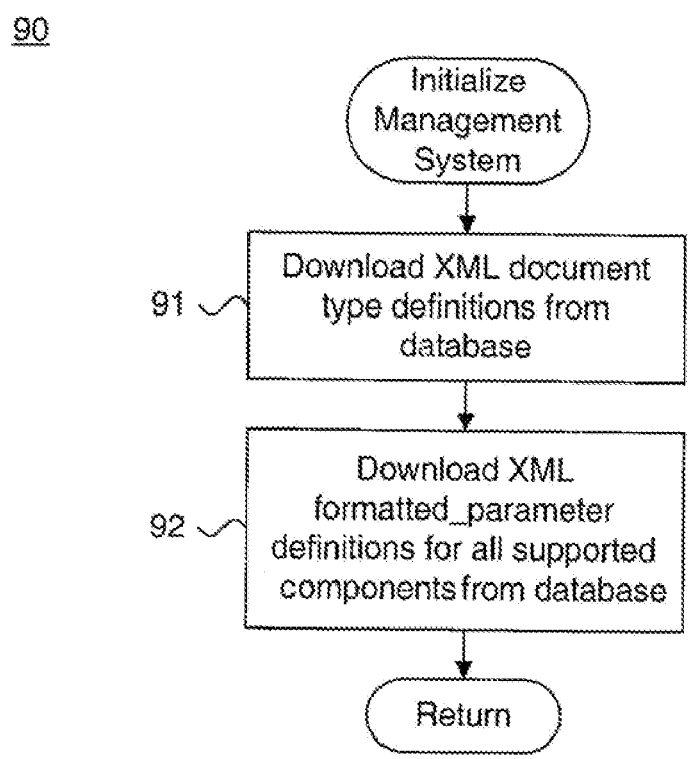
FIG. 6 is a flow diagram showing the routine for initializing the management system for use in the method of FIG. 5.

FIG. 6 is a flow diagram showing the routine 90 for initializing the management system 11 for use in the method of FIG. 5. The purpose of this routine is to download the necessary support files for use by the management system 11 prior to the initiation of the iterative processing loop.

Thus, the XML document type definitions 39 (shown in FIG. 2) are downloaded from the database repository 38 (block 91). The XML formatted parameter definitions, stored as global parameter definitions 42 (shown in FIG. 2) for all supported components, are also downloaded from the database repository 38 (block 92). The routine then returns.

Figure 7:
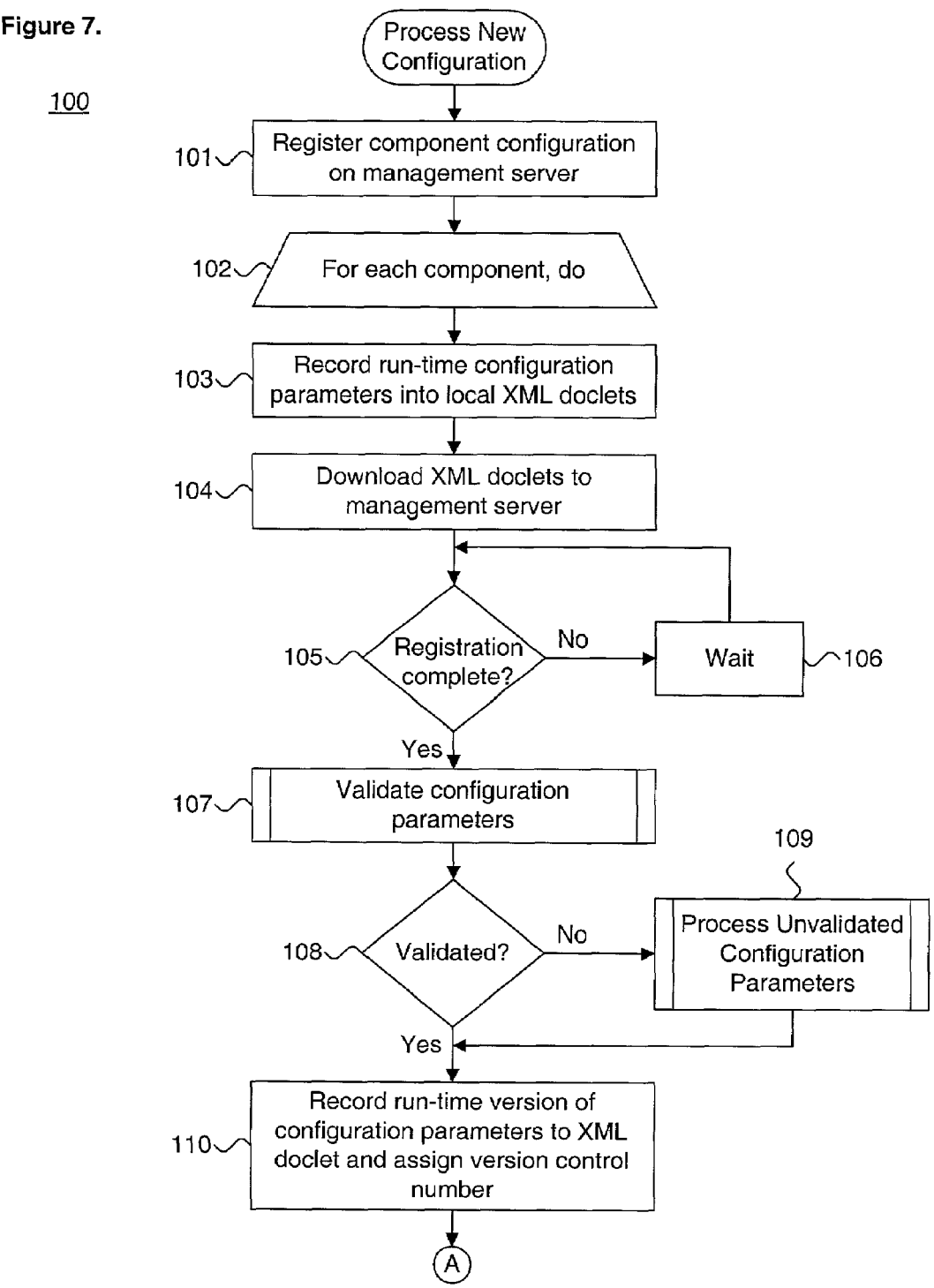
FIG. 7 is a flow diagram showing the routine for processing a new configuration for use in the method of FIG. 5.

FIG. 7 is a flow diagram showing the routine 100 for processing a new configuration for use in the method of FIG. 5. The purpose of this routine is to register and validate a new network component upon discovery through active probing.

Thus, the component configuration of each newly discovered component is registered on the management server 32 (block 101). Each individual component within the newly discovered configuration is iteratively processed (blocks 102-114) as follows. During each iteration (block 102), the runtime configuration parameters 41 (shown in FIG. 2) for each component are recorded into a well-formed local XML doclet (block 103). The XML doclets are downloaded to the management server 32 (block 104) and are registered (block 105). The management configuration module 35 will wait (block 106) until registration is complete (block 105), after which the configuration parameters are validated (block 107), as further described below with reference to FIG. 8.

If the configuration parameters 41 are not validated (block 108), the unvalidated configuration parameters are processed (block 109), as further described below with reference to FIG. 9. Otherwise, if validated (block 108), the runtime version of the configuration parameters 41 are recorded into XML doclets 40 and assigned a version control number (block 110).

In the described embodiment, the DOCLET_VERSION and DOCLET_DATE tags are used as a version control number. Next, the XML doclet 40 is sent to the specific server for which the component configuration is defined (block 111). The specific server then ensures the configuration parameters 41 are applied by the client module 33. The runtime configuration parameters are stored into the database repository 38 by the management server 32 (block 112) and, as an optional step, uploaded to a designated support site (block 113). Processing continues (block 114) for each remaining component (block 102), after which the routine returns.

Figure 8:
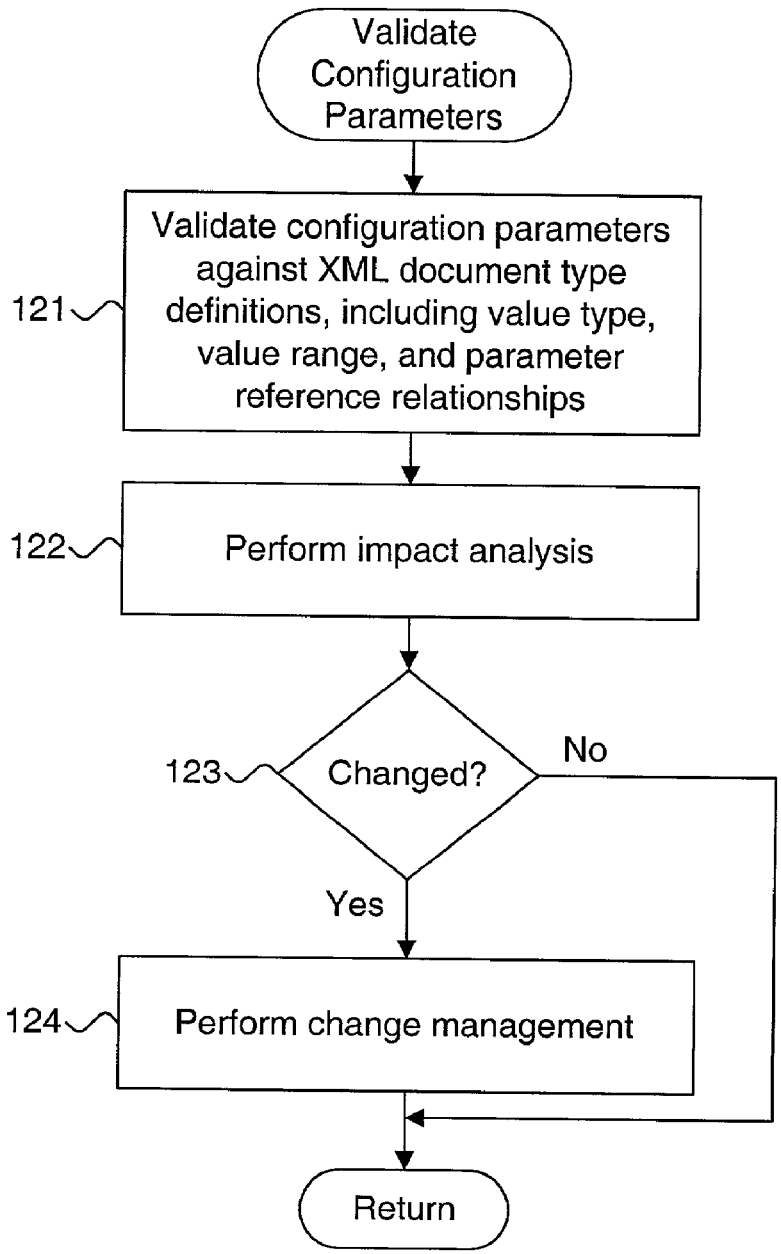
FIG. 8 is a flow diagram showing the routine for validating configuration parameters for use in the routine of FIG. 7.

FIG. 8 is a flow diagram showing the routine 120 for validating configuration parameters. The purpose of this routine is to validate, analyze and manage configuration parameters 41 (shown in FIG. 2).

Thus, the configuration parameters 41 are validated against the XML document type definitions 39 (shown in FIG. 2) retrieved from the database repository 38 (block 121). Validation includes checking the value type, value range and any parameter reference relationships. Next, an impact analysis is performed (block 122). The impact analysis includes dynamically traversing the dependent relationship tree to ensure that the configuration policy is enforced. If the configuration parameters reflect changed values (block 123), change management is performed (block 124). Change management includes managing, advising, and alerting a system administrator as to the effect of each change, as well as actually applying the changes. The routine then returns.

Figure 9:
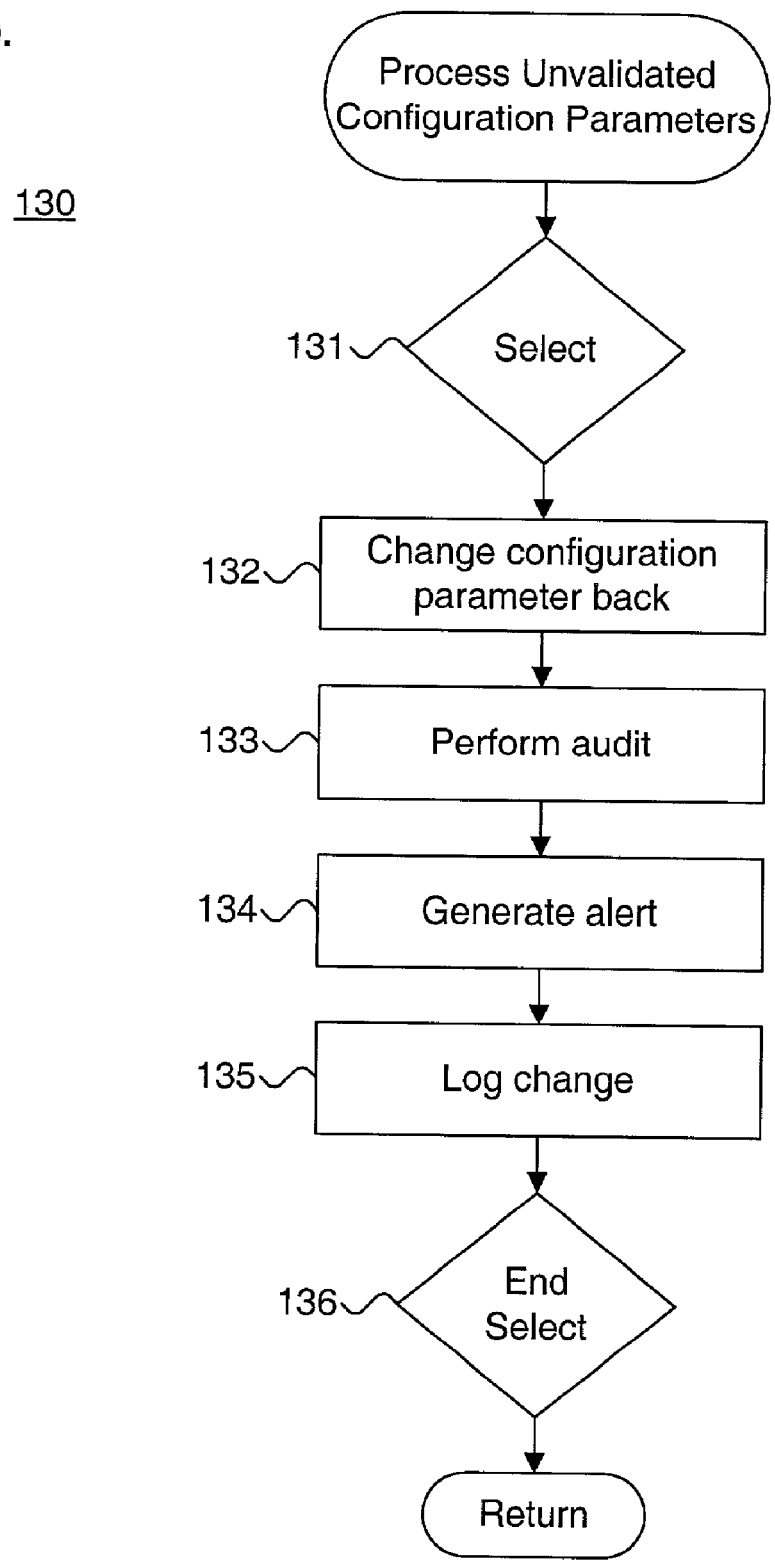
FIG. 9 is a flow diagram showing the routine for processing unvalidated configuration parameters for use in the routine of FIG. 7.

FIG. 9 is a flow diagram showing the routine 130 for processing unvalidated configuration parameters for use in the routine of FIG. 7. The purpose of this routine is gracefully process configuration parameters 41 (shown in FIG. 2) that fail validation.

The unvalidated configuration parameters are processed by performing one or more selected operations (blocks 131-136), as follows. First, an unvalidated but changed configuration parameter can be changed back (132) to a previously-validated value or to a default value as indicated in the global parameter definitions 42 (shown in FIG. 2). Second, the management system 11 can perform an audit (block 133) over all of the configuration parameters to determine the effect of the unvalidated configuration parameter. Third, an alert can be generated to the administrator (block 134). As well, the unvalidated configuration parameter change can be logged (block 135), thereby resulting in the acquiescence of the unvalidated configuration parameter change.

Upon completion of one or more of the foregoing operations, the routine returns.

Figure 10:
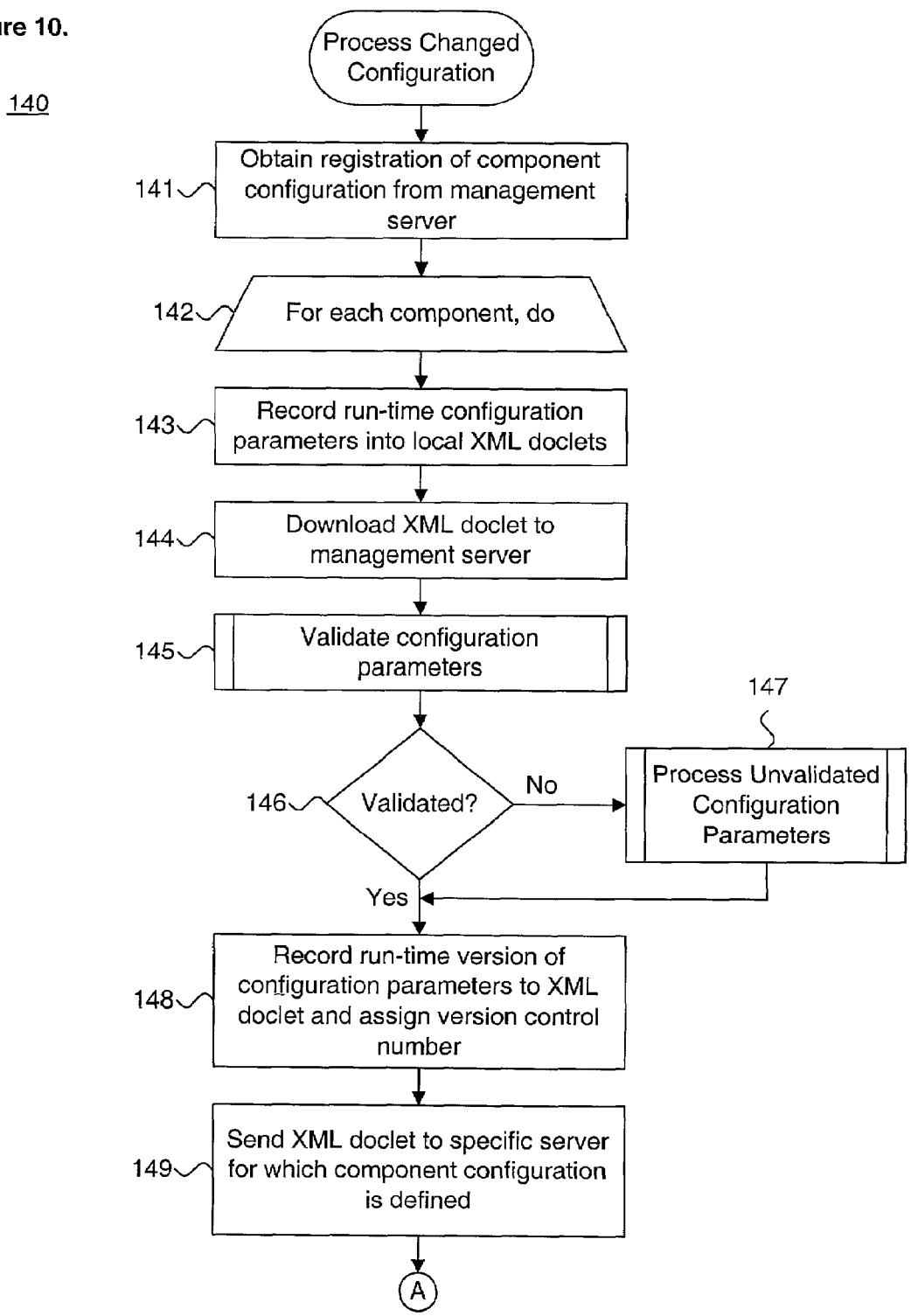
FIG. 10 is a flow diagram showing the routine for processing a changed configuration for use in the method of FIG. 5.

FIG. 10 is a flow diagram showing the routine 140 for processing a changed configuration for use in the method of FIG. 5. The purpose of this routine is to register and validate a changed component upon discovery through probing.

Thus, the registration of the component configuration of the changed network component is obtained from the management server 32 (block 141). Each individual component within the newly discovered configuration is iteratively processed (blocks 142-152) as follows. During each iteration (block 142), the runtime configuration parameters 41 (shown in FIG. 2) for each component are recorded into a well-formed local XML doclet (block 143). The XML doclets are downloaded to the management server 32 (block 144) and validated (block 145), as further described below with reference to FIG. 8.

If the configuration parameters 41 are not validated (block 146), the unvalidated configuration parameters are processed (block 147), as further described below with reference to FIG. 9. Otherwise, if validated (block 146), the runtime version of the configuration parameters 41 are recorded into XML doclets 40 and assigned a version control number (block 148).

In the described embodiment, the DOCLET_VERSION and DOCLET_DATE tags are used as a version control number. Next, the XML doclet 40 is sent to the specific server for which the component configuration is defined (block 149). The specific server then ensures the configuration parameters 41 are applied by the client module 33. The runtime configuration parameters are stored into the database repository 38 by the management server 32 (block 150) and, as an optional step, uploaded to a designated support site (block 151). Processing continues (block 152) for each remaining component (block 142), after which the routine returns.

While the invention has been particularly shown and described as referenced to the embodiments thereof, those skilled in the art will understand that the foregoing and other changes in form and detail may be made therein without departing from the spirit and scope of the invention.

APPENDIX A

```
<!-- DOCTYPE BLOBAL_NODES_DOCLET [-->
<!-- This DTD defines the necessary elements for Managed nodes and
    their resources. This DTD also contains
    a DTD version element to ensure proper functionality
-->
<!-- Root doclet element definition -->
<!ELEMENT GLOBAL_NODES_DOCLET ( DOCLET_VERSION,
    DOCLET_DATE, RACK_NAME, NODE_TYPE*)>
<!ELEMENT DOCLET_VERSION (#PCDATA)>
<!ELEMENT DOCLET_DATE (#PCDATA)>
<!ELEMENT RACK_NAME (#PCDATA)>
<!ELEMENT NODE_TYPE
    (IAS | DATABASE | EBIZ | ICACHE | WEB_CACHE | MGMT )>
<!ELEMENT LAS           (NODE*)>
<!ELEMENT DATABASE      (NODE*)>
<!ELEMENT EBIZ          (NODE*)>
<!ELEMENT ICACHE        (NODE*)>
<!ELEMENT WEB_CACHE     (NODE*)>
<!ELEMENT MGMT          (NODE*)>
<!ELEMENT NODE     (PUBLIC_NODE_NAME*,
    PUBLIC_IP_ADDRESS*, PRIVATE_NODE_NAME*,
    PRIVATE_IP_ADDRESS*, HW_RESOURCE)>
<!ELEMENT PUBLIC_NODE_NAME (#PCDATA)>
<!ATTLIST PUBLIC_NODE_NAME ALIAS    CDATA "NULL">
<!ELEMENT PUBLIC_IP_ADDRESS (#PCDATA)>
<!ELEMENT PRIVATE_NODE_NAME (#PCDATA)>
<!ATTLIST PRIVATE_NODE_NAME ALIAS   CDATA "NULL">
<!ELEMENT PRIVATE_IP_ADDRESS (#PCDATA)>
<!ELEMENT HW_RESOURCE      (MBOARD, NIC*,
    HBA*, STORAGE)>
<!ELEMENT MBOARD       (#PCDATA)>
<!ATTLIST MBOARD           VENDOR     CDATA #REQUIRED
    MEMORY    CDATA #REQUIRED
    MEMORY_UNIT    (MB | GB) "MB"
    CPU_COUNT    CDATA #REQUIRED
    CPU_TYPE     CDATA #REQUIRED
    CPU_MHZ      CDATA #REQUIRED>
<!-- The name of the NIC may be the same as the vendor or model. -->
<!ELEMENT NIC            (#PCDATA)>
<!ATTLIST MC             VENDOR     CDATA #REQUIRED
    MODEL     CDATA #REQUIRED
    TX_TYPE     (100MBIT | GIGABIT) "100MBIT"
    IP_ADDRESS    CDATA #REQUIRED >
<!-- For HBA controllers, Notice we spell fiber the correct way, not the
English way.
<!ELEMENT HBA            (#PCDATA)>
<!ATTLIST HBA            VENDOR     CDATA #REQUIRED
    MODEL     CDATA #REQUIRED
    TYPE (IDE | UW_SCSI2 | SCSI3 | FIBER) "FIBER">
<!ELEMENT STORAGE           (NAS*, DA*, SAN*, SSP*)>
<!ELEMENT NAS            (#PCDATA)>
<!ATTLIST NAS            IP_ADDRESS    CDATA #REQUIRED>
<!ELEMENT DA             (DISK*)>
<!ELEMENT DISK           (#PCDATA)>
<!ATTLIST DISK           HBA_NAME     CDATA #REQUIRED
```

APPENDIX A-continued

```
    LUN_ID              CDATA #REQUIRED
    CAPACITY            CDATA #REQUIRED
    CAPACITY_UNIT ( MB | GB | TB ) "GB" >
<!ELEMENT SAN           (#PCDATA)>
<!ATTLIST SAN    ZONE   CDATA #REQUIRED>
<!ELEMENT SSP           (#PCDATA)>
```

APPENDIX B

```
<?xml version ="1.0" standalone="no" ?>
<!DOCTYPE GLOBAL_NODES_DOCLET SYSTEM
"/home/oracle/dve/appliance/xml/rack_nodes.dtd" >
<GLOBAL_NODES_DOCLET>
    <DOCLET VERSION>0.0.1</DOCLET_VERSION>
    <DOCLET_DATE>26-FEB-2001</DOCLET_DATE>
    <RACK_NAME>TEST_RACK1</RACK_NAME>
    <NODE_TYPE>
        <DATABASE>
            <NODE>
                <PUBLIC_NODE_NAME
                    ALIAS     = "dpresley-linux"
                    >dpresley-linux.us.oracle.com</PUBLIC_NODE_NAME>
                <PUBLIC_IP_ADDRESS>130.68.30.114
                </PUBLIC_IP_ADDRESS>
                <HW_RESOURCE>
                    <MBOARD
                        VENDOR     = "Supper Micro"
                        MEMORY     = "1"
                        MEMORY_UNIT = "GB"
                        CPU_COUNT  = "2"
                        CPU_TYPE   = "Coppermine"
                        CPU_MHZ    = "800"
                        >440BX-2
                    </MBOARD>
                    <NIC
                        VENDOR     = "3COM"
                        MODEL      = "905C"
                        TX_TYPE    = "100MBIT"
                        IP_ADDRESS ="130.68.30.114"
                        >3COM-905C
                    </NIC>
                    <HBA
                        VENDOR     ="Adapttec"
                        MODEL      = "AHA7829"
                        TYPE       = "UW_SCSI2"
                        >scsi_00
                    </HBA>
                    <NBA
                        VENDOR     = "Adapttec"
                        MODEL      = "AHA2940"
                        TYPE       = "UW_SCSI2"
                        >scsi_01
                    </HBA>
                    <HBA
                        VENDOR     = "ON-BOARD"
                        MODEL      = "NULL"
                        TYPE       = "IDE"
                        >ide_00
                    </HBA>
                    <HBA
                        VENDOR     = "ON BOARD"
                        MODEL      = "NULL"
                        TYPE       = "IDE"
                        >ide_01
                    </HBA>
                    <STORAGE>
                        <DA>
                            <DISK
                                HBA_NAME    = "ide_00"
                                LUN_ID      = "0"
                                CAPACITY    = "17.2"
                                CAPACITY_UNIT = "GB"
                                >WDI-172430A
                            </DISK>
                            <DISK
```

APPENDIX B-continued

```
                                HBA_NAME    = "ide_00"
                                LUN_ID      = "1"
                                CAPACITY    = "17.2"
                                CAPACITY_UNIT = "GB"
                                >WDI-172430A
                            </DISK>
                            <DISK
                                HBA_NAME    = "ide_01"
                                LUN_ID      = "0"
                                CAPACITY    = "17.2"
                                CAPACITY_UNIT = "GB"
                                >WDI-172430A
                            </DISK>
                            <DISK
                                HBA_NAME    = "ide_01"
                                LUN_ID      = "1"
                                CAPACITY    = "17.2"
                                CAPACITY_UNIT = "GB"
                                >WDI-172430A
                            </DISK>
                        </DA>
                    </STORAGE>
                </HW_RESOURCE>
            </NODE>
        </DATABASE>
    </NODE_TYPE>
    </NODE_TYPE>
    <IAS>
    </IAS>
    </NODE_TYPE>
    <NODE_TYPE>
        <EBIZ>
        </EBIZ>
    </NODE_TYPE>
</GLOBAL_NODES_DOCLET>
```

APPENDIX C

```
<PARAMETER>
    <PARAMETER_NAME
        P_ID       = "DB_180"
        TYPE       = "NUMBER"
        RANGE_TYPE = "RANGE"
        RANGE      = "1:65355"
        OVERRIDE   = "YES"
        COMPUTED_VALUE    = "1.1 * :R_001"
        >SESSIONS
    </PARAMETER_NAME>
    <REF_PARAMETER
        R_ID       = "R_001"
        REF_COMPONENT_TYPE = "DATABASE"
        REF_COMPONENT_NAME =
            "ORACLE8I_RDBMS_SERVER"
        >PROCESSES
    </REF_PARAMETER>
</PARAMETER>
```

APPENDIX D

```
<PARAMETER>
    <PARAMETER_NAME
        P_ID       = "DB_180"
        TYPE       = "NUMBER"
        VALUE      = "330"
        DEFAULT_VALUE    = "110"
        DERRIVED_VALUE   = "330"
        OVERRIDE   = "YES"
        >SESSIONS
    </PARAMETER_NAME>
    <REF_PARAMETER
        R_ID       = "DB_160"
        REF_COMPONENT_TYPE = "DATABASE"
        REF_COMPONENT_NAME =
            "ORACLE8I_RDBMS_SERVER"
```

APPENDIX D-continued

```
REF_COMPONENT_NODE = "dprelsey-linux.us.oracle.com"
    >PROCESSES
    </REF_PARAMETER>
</PARAMETER>
```

What is claimed is:

1. A system for actively managing configurable components, comprising:
 a plurality of components, each component storing a configuration comprising a set of configuration parameters;
 a repository that stores information about a configuration policy;
 a server configured to (a) register each of the plurality of components, (b) perform dynamic probing operations on each of the plurality of components to identify configuration changes made to the configuration of each of the plurality of components, and (c) validate identified configuration changes against the configuration policy to determine whether the configuration changes conform to the configuration policy;
 wherein the configuration policy defines, for each configuration parameter of the configuration of each of the plurality of components, a value range for which the configuration parameter will be successfully validated by the server;
 wherein, to validate a particular identified configuration change of the identified configuration changes against the configuration policy, the server determines whether results of the particular identified configuration change occurs within the value range.

2. A system according to claim 1, wherein the server comprises a set of core services for responding to an identified configuration change, wherein the set of core services comprises at least one of:
 a first service for changing a value of at least one configuration parameter to a default or previously validated value;
 a second service for auditing the configuration parameters of the configuration of at least one of the plurality of components;
 a third service for generating an alert regarding the configuration parameters of the configuration of at least one of the plurality of components; and
 a fourth service for acquiescing to the identified configuration change.

3. A system according to claim 1, further comprising:
 a log storing data that identifies an identified configuration change made to the configuration of a particular component.

4. A system according to claim 1, further comprising:
 a configuration and validation module for performing impact analysis on the identified configuration changes against the plurality of components.

5. The system of claim 1, wherein each of the plurality of components is separate from the server.

6. A method according to claim 1, wherein the information indicates a relationship dependency between a first configuration parameter in the configuration of a first component and a second configuration parameter in the configuration of a different component.

7. A system according to claim 6, wherein the server validates the configuration, for the first component, based upon the relationship dependency between the first configuration parameter and the second configuration parameter.

8. A system according to claim 6, wherein the relationship dependency comprises one of one-way, two-way, cyclic, one-to-many, many-to-one, and many-to-many.

9. A system according to claim 1, wherein the information includes at least one document type definition defining a mapping between the configuration of at least two of the plurality of individual components.

10. A method for actively managing configurable components, comprising:
 maintaining a repository, accessible to a server, that stores information about a configuration policy;
 registering, with the server, each of a plurality of components;
 performing dynamic probing operations on each of the plurality of components to identify configuration changes made to a configuration of each of the plurality of components; and
 validating, at the server, identified configuration changes against the configuration policy to determine whether the identified configuration changes conform to the configuration policy;
 wherein the configuration policy defines, for each configuration parameter of the configuration of each of the plurality of components, a value range for which the configuration parameter will be successfully validated by the server;
 wherein validating a particular identified configuration change of the identified configuration changes against the configuration policy comprises determining whether results of the particular identified configuration change occur within the value range.

11. A method according to claim 10, further comprising:
 responding to an identified configuration change by performing at least one of:
 changing a value of at least one configuration parameter to a default or previously validated value;
 auditing configuration parameters of the configuration of at least one of the plurality of components;
 generating an alert regarding the configuration parameters of the configuration of at least one of the plurality of components; and
 acquiescing to the identified configuration change.

12. A method according to claim 10, further comprising:
 logging data that identifies an identified configuration change made to the configuration of a particular component to a log file.

13. A method according to claim 10, further comprising:
 performing impact analysis on the identified configuration changes against the plurality of components.

14. A method according to claim 10, wherein the information indicates a relationship dependency between a first configuration parameter in the configuration of a first component and a second configuration parameter in the configuration of a different component.

15. A method according to claim 14, wherein the server validates the configuration, for the first component, based upon the relationship dependency between the first configuration parameter and the second configuration parameter.

16. A method according to claim 14, wherein the relationship comprises one of one-way, two-way, cyclic, one-to-many, many-to-one, and many-to-many.

17. A method according to claim 10, wherein the information includes at least one document type definition defining a mapping between the configuration of at least two of the plurality of individual components.

18. A method according to claim 14, wherein the relationship comprises one of one-way, two-way, cyclic, one-to-many, many-to-one, and many-to-many.

19. A method according to claim 10, wherein the configuration policy, stored in the repository, includes a master set of configuration parameters and type definitions for each of the plurality of components.

20. A computer-readable storage medium holding code which, when executed, performs the method according to any one of claims 10, 11, 12, 13, 14, 15, 17, 18, 19, and 16.

* * * * *

UNITED STATES PATENT AND TRADEMARK OFFICE
CERTIFICATE OF CORRECTION

PATENT NO. : 7,418,484 B2  Page 1 of 1
APPLICATION NO. : 09/998095
DATED : August 26, 2008
INVENTOR(S) : Darryl Lee Presley It is certified that error appears in the above-identified patent and that said Letters Patent is hereby corrected as shown below:

Col. 13, Line 59: delete "method", and insert --system--.

Signed and Sealed this

Thirtieth Day of June, 2009

JOHN DOLL
*Acting Director of the United States Patent and Trademark Office*

UNITED STATES PATENT AND TRADEMARK OFFICE
CERTIFICATE OF CORRECTION

PATENT NO.         : 7,418,484 B2
APPLICATION NO. : 09/998095
DATED                 : August 26, 2008
INVENTOR(S)       : Presley It is certified that error appears in the above-identified patent and that said Letters Patent is hereby corrected as shown below:

On the Title Page Item (56), under "Other Publications", line 1-3, below "OTHER PUBLICATIONS" delete "Internatinal Searching Authority, "Notification of Transmittal of the International Search Report or the Declaration," Mar. 2, 2004, 7 pages.".

On page 2, Item (56), under "U.S. Patent Documents", line 30, delete "Crosble" and insert -- Crosbie --, therefor.

On page 2, Item (56), under "Other Publications", line 1, delete "fo" and insert -- of --, therefor.

On page 2, Item (56), under "Other Publications", line 1, delete "19" and insert -- 18 --, therefor.

In column 4, line 30, delete "1416," and insert -- 14-16, --, therefor.

In column 10, line 22, delete "BLOBAL" and insert -- GLOBAL --, therefor.

In column 10, line 33, delete "LAS" and insert -- IAS --, therefor.

In column 10, line 54, delete "MC" and insert -- NIC --, therefor.

In column 10, line 58, after "way." insert -- → --.

In column 11, line 17, delete "<DOCLET VERSION>" and insert -- <DOCLET_VERSION> --, therefor.

In column 11, line 23, delete "<IPUBLIC" and insert -- </PUBLIC --, therefor.

In column 11, line 24, delete "<PUBLIC IP ADDRESS>" and insert -- <PUBLIC_IP_ADDRESS> --, therefor.

In column 11, line 44, delete "<NBA" and insert -- <HBA --, therefor.

In column 11, line 55, delete ""ON BOARD"" and insert -- "ON-BOARD" --, therefor.

In column 12, line 25, delete "</NODE TYPE>" and insert -- <NODE_TYPE> --, therefor.

In column 12, line 60, delete "DERRIVED" and insert -- DERIVED --, therefor.

CERTIFICATE OF CORRECTION (continued)
U.S. Pat. No. 7,418,484 B2

In column 15, line 3-5, in claim 18, delete "A method according to claim 14, wherein the relationship comprises one of one-way, two-way, cyclic, one-to-many, many-to-one, and many-to-many." and insert -- A method according to claim 10, wherein a particular configuration change comprises a change to a configuration parameter or type definition associated with a particular component. --, therefor.

Signed and Sealed this

Twenty-third Day of March, 2010

David J. Kappos
*Director of the United States Patent and Trademark Office*